United States Patent
Hoffmann et al.

(10) Patent No.: US 9,010,764 B2
(45) Date of Patent: Apr. 21, 2015

(54) SLIDE RING SEAL

(75) Inventors: Tobias Hoffmann, Talheim (DE);
Eckhard Ogaza, Obersulm (DE)

(73) Assignee: KACO GmbH + Co. KG, Heilbronn (DE)

( * ) Notice: Subject to any disclaimer, the term of this patent is extended or adjusted under 35 U.S.C. 154(b) by 456 days.

(21) Appl. No.: 12/890,604

(22) Filed: Sep. 25, 2010

(65) Prior Publication Data

US 2011/0079961 A1   Apr. 7, 2011

(30) Foreign Application Priority Data

Oct. 1, 2009   (DE) .......................... 10 2009 049 093

(51) Int. Cl.
*F16J 15/36*   (2006.01)
*F16J 15/34*   (2006.01)

(52) U.S. Cl.
CPC .................................. *F16J 15/3476* (2013.01)
USPC ......................................... 277/377; 277/358

(58) Field of Classification Search
CPC .. F16J 15/3436; F16J 15/3452; F16J 15/3476
USPC ......................................... 277/358, 377, 385
See application file for complete search history.

(56) References Cited

U.S. PATENT DOCUMENTS

| 3,515,394 | A | 6/1970 | Stevens |
| 5,873,574 | A | 2/1999 | Ringer |
| 6,311,983 | B1 | 11/2001 | Burcham |
| 6,398,223 | B1 * | 6/2002 | Radosav ........................ 277/352 |
| 6,568,687 | B2 * | 5/2003 | Radosav ........................ 277/389 |
| 6,789,803 | B2 * | 9/2004 | Radosav ........................ 277/377 |
| 2002/0047240 | A1 * | 4/2002 | Radosav ........................ 277/389 |
| 2005/0252037 | A1 | 11/2005 | Hofmann |
| 2010/0237564 | A1 * | 9/2010 | Yasu et al. .................... 277/358 |

FOREIGN PATENT DOCUMENTS

| CN | 1646039 A | 7/2005 |
| DE | 197 39 398 A1 | 3/1999 |
| FR | 2 787 852 A1 | 6/2000 |
| JP | 45-13968 | 5/1970 |
| JP | 54-65249 A | 5/1979 |
| JP | 57-153854 | 3/1981 |
| JP | 60-194668 | 12/1985 |
| JP | 09-292034 A | 11/1997 |
| JP | 2008-518165 A | 5/2008 |
| WO | 2006/043877 A1 | 4/2006 |

* cited by examiner

*Primary Examiner* — Gilbert Lee
(74) *Attorney, Agent, or Firm* — Gudrun E. Huckett

(57) ABSTRACT

Slide ring seals have the problem that they generate noise under certain conditions of use. In order to suppress this noise in an effective way, the slide ring seal has at least one damping part that comprises at least one shaped sheet metal part. It is provided with at least one elastically deformable spring part that is supported under pretension. Between the damping part and the support area microfriction is generated that leads to an effective noise damping action. The slide ring seal is advantageously used in the automotive field.

17 Claims, 19 Drawing Sheets

SLIDE RING SEAL

BACKGROUND OF THE INVENTION

The invention concerns a slide ring seal with at least one holder for at least one of the sealing elements that are formed by a sealing ring and a counter ring and that rest seal-tightly against one another under axial force action.

Slide ring seals have the problem that under certain conditions of use they generate noise. Currently, there are no effective measures in order to dampen the slide ring seal satisfactorily and to prevent noise.

SUMMARY OF THE INVENTION

The present invention has the object to configure the slide ring seal of the aforementioned kind such that it can be manufactured inexpensively and ensures an effective noise damping action.

This object is solved for the slide ring seal of the aforementioned kind in accordance with the present invention in that in that the slide ring seal has at least one damping part that comprises at least one shaped sheet metal part that is provided with at least one elastically deformable spring part that is supported under pretension.

The damping part has a shaped sheet metal part that can be produced in a simple and inexpensive way. Because of its shape stability it can be mounted in a simple way in the slide ring seal. The sheet metal part ensures a long service life of the damping part. By means of the spring part the damping part is supported with pretension. Because the damping part is made of metal, a targeted pretension force can be adjusted in order to obtain a damping action that is optimally adjusted with respect to the use of the slide ring seal. Between the damping part and the support area there exists microfriction that results in the damping action. The damping part suppresses noise effectively even under extreme operating conditions. It can be manufactured inexpensively and can be mounted without problems and ensures at the same time a long service life. The slide ring seal is advantageously used in the automotive field.

In one embodiment of the invention, the dam ping part has an outer wall that is supported on a wall of the mounting space of the slide ring seal with radial pretension.

It is advantageous when the spring part about its circumference is provided with a profiling, preferably a wave-shaped profiling. On the one hand, it ensures an optimal damping action; on the other hand, a high stability of the damping part is achieved thereby.

The slide ring seal according to the invention is preferably used in water pumps for noise damping. The damping part, in particular its spring part, is designed such that it generates microfriction that causes an optimal noise damping action.

Further features of the invention result from the additional claims, the description, and drawings.

BRIEF DESCRIPTION OF THE DRAWINGS

The invention will be explained in more detail in the following with the aid of several embodiments illustrated in the drawings.

DESCRIPTION OF PREFERRED EMBODIMENTS

Figure 1:
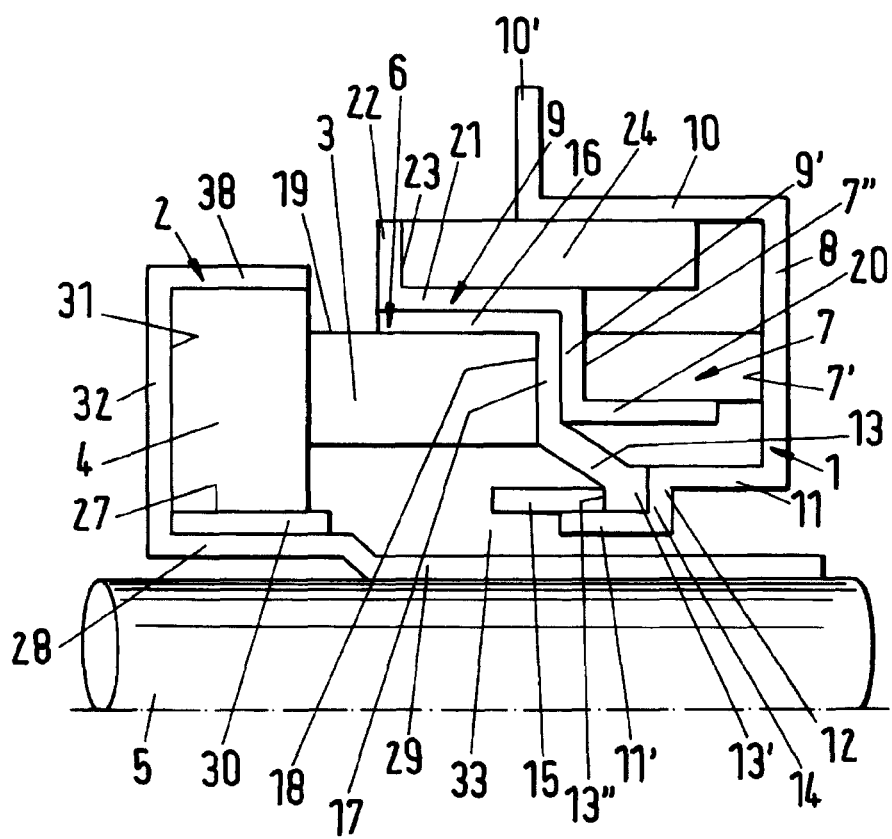
FIG. 1 shows one half of a first embodiment of a slide ring seal according to the invention in axial section.

The seal illustrated in FIG. 1 is embodied as a slide ring seal that, as is known, comprises a cup-shaped housing 1, a sleeve-shaped holder 2, a slide ring 3, and a counter ring 4. The holder 2 is seated with a tubular inner wall 29 with press fit on a shaft 5. The counter ring 4 is positioned with its end face 31 facing away from the slide ring 3 on a radially outwardly projecting annular bottom 32 of the holder 2.

The slide ring 3 is supported so as not to rotate while the counter ring 4 rotates with the shaft 5. The slide ring 3 is attached to a secondary seal 6 embodied as a bellows that under the force of a pressure spring 7 forces the slide ring 3 against the counter ring 4. The pressure spring 7 is positioned with one end 7' on the radial bottom 8 of the housing 1 and with the other end 7" on a radially extending annular stay 9' of a spring plate 9.

The housing 1 has a cylindrical outer wall 10 whose free end 10' is angled radially outwardly. The housing wall 10 adjoins the radially inwardly extending bottom 8 that adjoins a cylindrical inner wall 11. At approximately half the axial length it passes by means of a radially inwardly projecting shoulder surface 12 into a radially and axially farther inwardly positioned free inner wall section 11'. The axis of the outer and inner walls 10 and 11 coincides with the axis of the shaft 5.

The secondary seal 6 projects with a thicker inner rim 13' of a conical part 13 into an outer shoulder 14 that is formed by the shoulder surface 12 and the wall section 11'. In order to axially press the secondary seal 6 or its conical part 13 into the shoulder 14, a sleeve 15 is provided that rests on the outer side of the inner wall section 11' and annular rim 13' of the conical part 13. The secondary seal 6 in the illustration according to FIG. 1 has a substantially Z-shaped cross-section with a cylindrical outer wall 16 that passes with a radially inwardly projecting annular section 17 into the conical part 13.

The slide ring 3 and the counter ring 4 are embodied as is known and are therefore not explained in detail.

The secondary seal 6 advantageously rests with its annular section 17 with its entire annular surface against the neighboring end face 18 of the slide ring 3. With its cylindrical outer wall 16 the secondary seal 6 rests against the outer wall surface 19 of the slide ring 3. The spring plate 9, similar to the secondary seal 6, has a Z-shaped cross-sectional shape. In contrast to the secondary seal 6, the radial inner part 20 of the spring plate 9 is cylindrical. The radial outer part 21 of the spring plate 9 is also cylindrical and surrounds the slide ring about more than half its axial extension. The cylindrical part 21 of the spring plate 9 passes into a radially outwardly bent annular rim 22. On an outer shoulder 23 of the spring plate 9 that is delimited by the rim 22 and the cylindrical part 21a damping part 24 is resting that is illustrated in more detail in FIG. 12. The damping part 24 serves for vibration damping by generating microfriction. The microfriction is generated between the damping part 24 and the inner side of the outer wall 10 of the housing 1 as well as the outer side of the cylinder part 21 of the spring plate 9.

The inner wall 29 of the holder 2 has an axially recessed cylinder section 28 that adjoins the annular bottom 32. The section 28 has an axial extension that is minimally greater than the axial width of the counter ring 4. The flange 32 passes outwardly into a further cylindrical section 38 that extends coaxially to the section 28 and has a minimally smaller axial extension. The latter is identical to the axial width of the counter ring 4. An annular sleeve 30 is resting against the cylindrical section 28 of the holder 2 and the cylindrical wall surface 27 of the counter ring 4 in order to provide a sealing action. Its axial extension is slightly smaller than that of the section 28 and slightly greater than that of the counter ring 4 or of the section 28 of the holder 2. The sleeve 30 serves also for securing the counter ring 4 in the holder 2.

The housing 1 projects with its cylindrical inner wall 11 with radial play into an annular space 33 that is formed between the slide ring 3 and the inner wall 29 of the holder 2.

Figure 12:
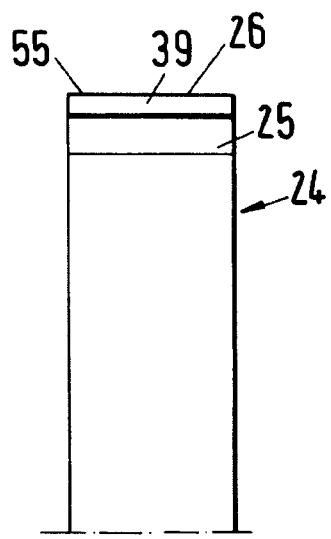
FIG. 12 shows one half of a first embodiment of an annular damping part of the slide ring seal according to the invention in axial section.

The configuration of the annular damping part 24 will be explained in more detail with the aid of FIGS. 12, 12a, 12b in more detail. The wall 55 of the damping part 24 is profiled in a wave shape. In this way, about the circumference ribs 39 and depressions 25 are formed in an alternating arrangement. Advantageously, the ribs 39 and the depressions 25 in radial section are curved. With the ribs 39 the damping part 24 rests with pretension against the inner wall of the housing 1 as well as on the outer side of the cylindrical part 21 of the spring plate 9. As shown in FIG. 1, the damping part 24 is projecting axially out of the housing 1 in the direction toward the rim 22 of the secondary seal 6 that is positioned at an axial spacing away from the rim 10' of the housing 1. The damping part 24' is positioned with one end face on the annular rim 22. The other end face of the damping part 24 is axially spaced from the housing bottom 8.

Figure 12A:
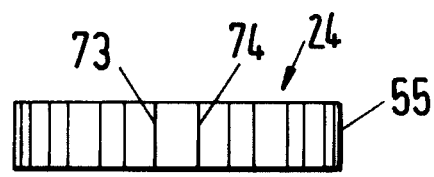
FIG. 12*a* shows the damping part according to FIG. 12 in a side view.
Figure 12B:
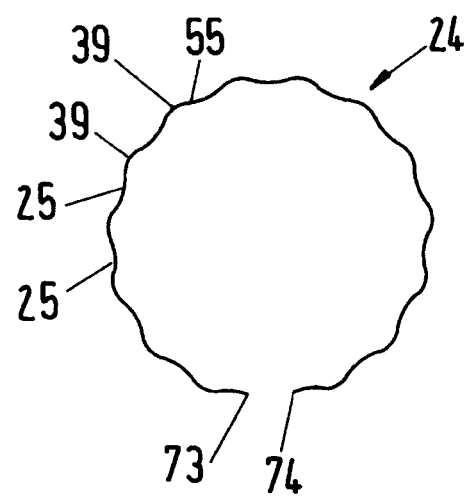
FIG. 12*b* shows the damping part according to FIG. 12*a* in a plan view.

As shown in FIGS. 12a and 12b, the damping part 24 has a large number of ribs 39 and depressions 25. The damping part 24 is not closed. In this way, an optimal elasticity of the damping part is provided. In the mounted position the two ends 73, 74 of the damping part 24 can be spaced from one another. It is also possible that the ends 73, 74 in the mounted position overlap one another. The two ends 73, 74 of the damping part 24 can move relative to one another in circumferential direction of the damping part.

The damping part 24 is formed by a shaped sheet metal part that is preferably comprised of spring steel. Such a damping part can be manufactured in a simple and inexpensive way.

The damping part 24 is supported by the ribs 39 in the mounted position radially on the housing 1 as well as on the spring plate. By means of this radial support the pressing or closing force that is acting in axial direction of the slide ring seal and is acting on the slide ring 3 is practically not impaired. In this way, the tribological properties of the slide ring seal in the area of the sealing gap between the slide ring 3 and the counter ring 4 remain unaffected by the installation of the damping part 24. The damping part 24 prevents effectively the rotational or circumferential vibrations of the slide ring 3 during its use without having a disadvantageous effect on the sealing action.

The damping part 24 can be coated at least on one side, for example, for providing a corrosion protection, wear protection and the like. Also, such a coating can be used in order to obtain a targeted microfriction between the damping part 24 and the housing 1 or the spring plate 9.

The damping part 24 can also be completely enveloped.

It is moreover possible to provide different coatings on the inner and on the outer side of the damping part 24. In this way, it is possible to obtain on both sides of the damping part 24 different microfriction values. In this way, a very simple and still effective adaptation to different mounting conditions is possible.

The damping part 24 can also be provided with appropriate surface structures in order to obtain the desired microfriction values. Such surface structures can be, for example, obtained by roughening, by structures generated by laser and the like.

It is moreover possible to provide instead of the damping part 24 the appropriate counter surface on the housing 1 or on the spring plate 9 with a corresponding coating and/or an appropriate surface structure.

With the damping part 24, a noise generation when using the slide ring seal can be prevented reliably. With the damping part 24 by means of the ribs 39 a radial contact between the spring plate 9 and the housing 1 is produced.

The holder 2 is advantageously formed by a steel part that is supported, secured against rotation, on the shaft 5 to be sealed. The counter ring 4 serves for providing a dynamic sealing action and rotates, because it is mounted in the holder 2, together with the shaft 5. The sleeve 15 serves for providing an axial pressing action on the conical part 13 of the secondary seal 6 that provides the static sealing action of the slide ring seal. With the housing 1 the slide ring seal is pressed into a receiving space of a component (not illustrated), for example, a pump housing. The outer wall 10 of the housing 1 is then resting with press fit on the wall of the receiving space. The radially outwardly oriented flange 10' of the outer wall 10 can serve as a stop when mounting the slide ring seal when the housing 1 is pressed into the receiving space. The pressure spring 7 ensures that the slide ring 3 is pressed axially against the counter ring 4 so that the seal gap between the slide ring 3 and the counter ring 4 is closed properly. The spring plate 9 serves as a pressfit seat for the slide ring 3 that is projecting axially past the spring plate 9 as well as for the secondary seal 6.

The damping part 24 is comprised of metal, preferably a shaped spring steel sheet. It requires only minimal mounting space and can be produced in a simple way. The damping part 24 is radially clamped between the wall 21 of the spring plate 9 and the wall 10 of the housing 1 so that the ribs 39 of the damping part 24 rest with pretension on the spring plate 9 as well as on the housing wall 10. The damping part 24 can compensate radial movements of the slide ring 3 by appropriate elastic deformation of the ribs 39 and the depressions 25. The described microfriction of the damping part 24 moreover leads to an excellent damping action.

Figure 13:
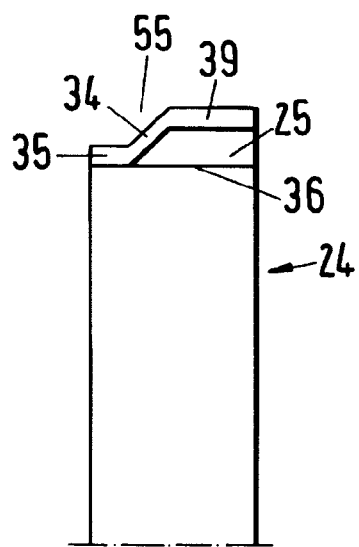
FIG. 13 shows in an illustration in accordance with FIG. 12 a second embodiment of an annular damping part.

As illustrated in an exemplary fashion in FIG. 13, the ribs 39 and the depressions 25 must not be provided about the entire axial width of the damping part 24. The ribs 39 and the depressions 25 of the profiled wall 55 extend only about half the axial width of the wall 55. They pass by means of slantedly extending intermediate section 34 into a narrow cylindrical section 35. The depressions 25 are advantageously so deep that, viewed in axial section according to FIG. 13, the inner side 36 of the cylinder section 35 also forms the deepest location of the depressions 25 at its inner side. With such a configuration the damping part 24 also provides for an excellent noise damping by microfriction.

Instead of the ribs 39 and the depressions 25, in this embodiment also tongues can be provided that are spaced apart from one another and are in an arrangement distributed about the circumference of the damping part 24. Also, the cylinder section 35 can be comprised of individual tongues that in the circumferential direction are positioned sequentially at a spacing behind one another.

In the slide ring seal according to FIG. 1 the damping part 24 can be designed in accordance with FIGS. 12, 12a, 12b or FIG. 13.

Figure 2:
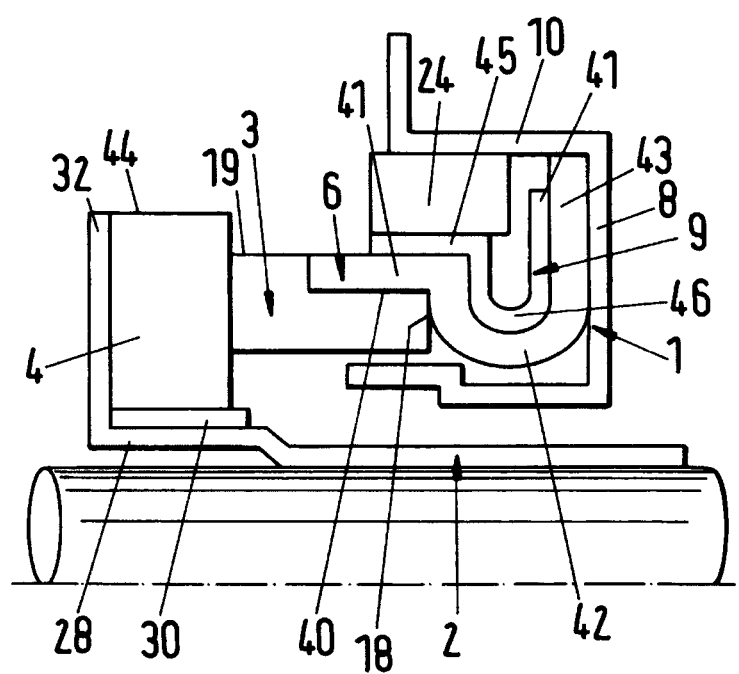
FIG. 2 shows one half of a second embodiment of a slide ring seal according to the invention in axial section.

FIG. 2 shows a slide ring seal having a slide ring 3 that is provided on its outer wall surface 19 with a recess 40 that is open toward the end face 18. This annular recess 40 is engaged by the secondary seal 6. It has a cylindrical section 41 that fills out the recess and has a transition into a spring part 42 that in axial section is bent in a part-circular shape. It has a transition into an annular disk section 43 extending in a radial plane with which the secondary seal 6 is resting against the inner side of the bottom 8 of the housing 1. The secondary seal 6 is designed such that the curved spring part is pretensioned and in this way forces the slide ring 3 against the counter ring 4. It is positioned with interposition of the sleeve 30 on the cylinder section 28 of the holder 2.

In contrast to the preceding embodiment, the annular bottom 32 of the holder 2 has no adjoining cylinder section. In this way, the outer wall surface 44 of the counter ring 4 is not covered. The annular bottom 32 in the radial direction has only such a length that its free end face is flush with the wall surface 44 of the counter ring 4. In this way, no interrupting step is formed where dirt particles and the like could deposit during operation of the slide ring seal.

The secondary seal 6 is forced by the spring element 9 against the slide ring 3 as well as the housing bottom 8. The spring element 9 in axial section is of a similar shape as the secondary seal 6. The spring element 9 is a shaped part that rests with a cylinder section 45 on the secondary seal. The cylinder section 45 is adjoined by a curved spring section 46 that in axial section is of a part-circular shape that rests against the outer side of the spring part 42 of the secondary seal 6 and passes into an end section 47. It extends radially and rests against the annular disk section 43 of the secondary seal 6. By means of the end section 47 the annular disk section 43 is forced against the housing bottom 8.

As in the preceding embodiment the damping part 24 is arranged between the spring element 9 and the housing 1. The damping part 24 is positioned with its ribs 39 under elastic pretension on the cylinder section 45 of the secondary seal 6 as well as on the outer wall 10 of the housing 1. The secondary seal 6 has in contrast to the preceding embodiment no radial outwardly projecting annular rim. The damping part 24 projects also axially slightly past the housing 1 in the direction of the counter ring 4 and has a spacing from the end section 47 of the spring element 9 as well as from the annular disk section 43 of the secondary seal 6. The damping part 24 can be embodied in accordance with FIGS. 12, 12a, 12b or FIG. 13. As in the preceding embodiment, the damping part 24 produces radial contact between the spring element 9 and the housing 1.

Figure 3:
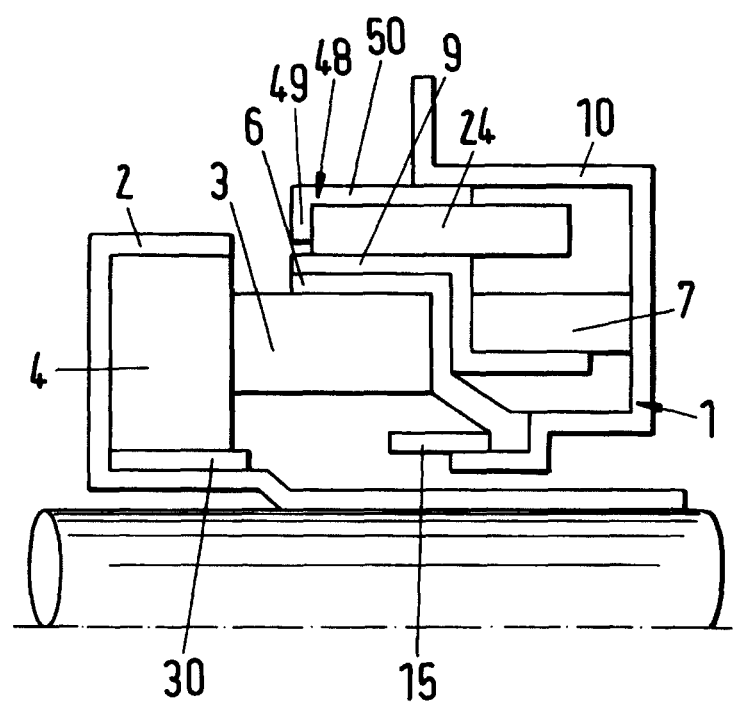
FIG. 3 shows one half of a third embodiment of a slide ring seal according to the invention in axial section.

FIG. 3 shows a slide ring seal that is of a similar configuration as the slide ring seal according to FIG. 1. The difference resides in that the damping part 24 is not resting immediately on the outer wall 10 of the housing 1 but with intermediate positioning of a retaining element 48. It has an L-shaped cross-section with radially inwardly extending flange 49 with which the retaining element 48 rests against the end face of the damping part 24. The flange 49 positioned in a radial plane adjoins radially outwardly a cylindrical wall 50 that projects into the housing 1 and, about a portion of its length, rests against the inner wall surface of the outer wall 10 of the housing. The cylinder wall 50 is resting with its entire length on the damping part 24, i.e., the ribs 39 of the damping part 24 are contacting the inner wall surface of the cylinder wall 50. By means of flange 49 the damping part 24 is secured axially in one direction. As a result of the flange 49 the radially outwardly oriented annular rim 22 of the spring plate 9, as it is provided in the embodiment according to FIG. 1, is not required. The damping part 24 is resting on the spring plate 9 in the described way which, in turn, is arranged on the secondary seal 6. In other respects, this embodiment is of the same configuration as the embodiment of FIG. 1.

Figure 4:
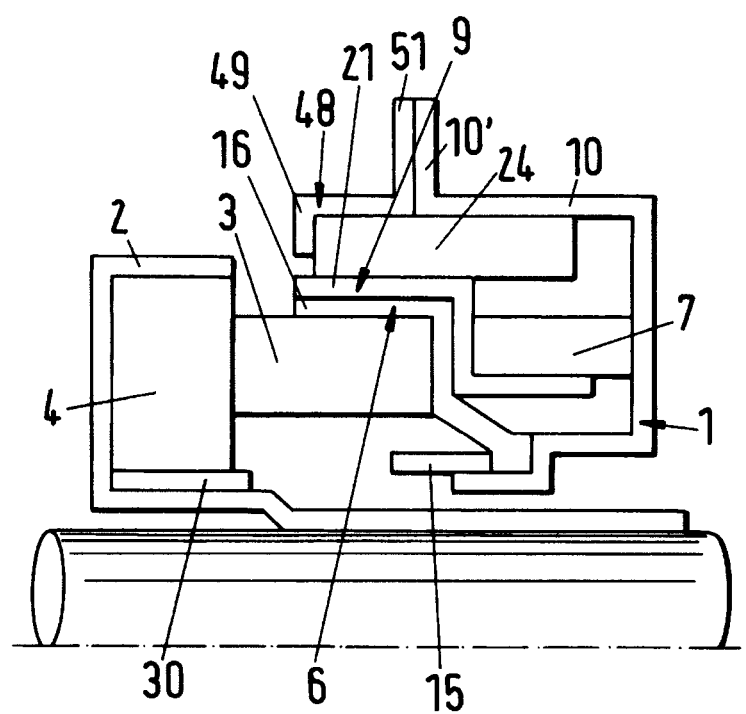
FIG. 4 shows one half of a fourth embodiment of a slide ring seal according to the invention in axial section.

FIG. 4 shows an embodiment that is substantially of the same configuration as the embodiment according to FIG. 3. The retaining element 48 has not only at one end the flange 49 that engages across the end face of the damping part 24 but at the other end also a further radially oriented flange 51. It is resting on the radially outwardly oriented flange 10' of the housing 1 and is fixedly connected thereto. The two flanges 51, 10' are advantageously of the same length. The cylindrical inner side of the outer wall 10 of the housing 1 and of the retaining element 48 are positioned advantageously aligned with one another so that at the transition between the flanges 10', 51 there is no disruptive step. In this way, a continuous cylindrical support surface for the damping part 24 is also formed that rests with its ribs 39 (FIG. 12, FIG. 12a, FIGS. 12b, and 13) under radial pretension against the secondary seal 6, the spring plate 9 as well as the retaining element 48 and the housing wall 10. The radially inwardly oriented flange 49 of the retaining element 48 is advantageously arranged such that its outer side is aligned with the end face of the cylinder section 21 of the spring plate 9 in a common radial plane. But the end face of the outer wall 16 of the secondary seal 6 is positioned also advantageously in this radial plane.

In other respects, the slide ring seal according to FIG. 4 is of the same configuration as the embodiment of FIG. 1.

Figure 5:
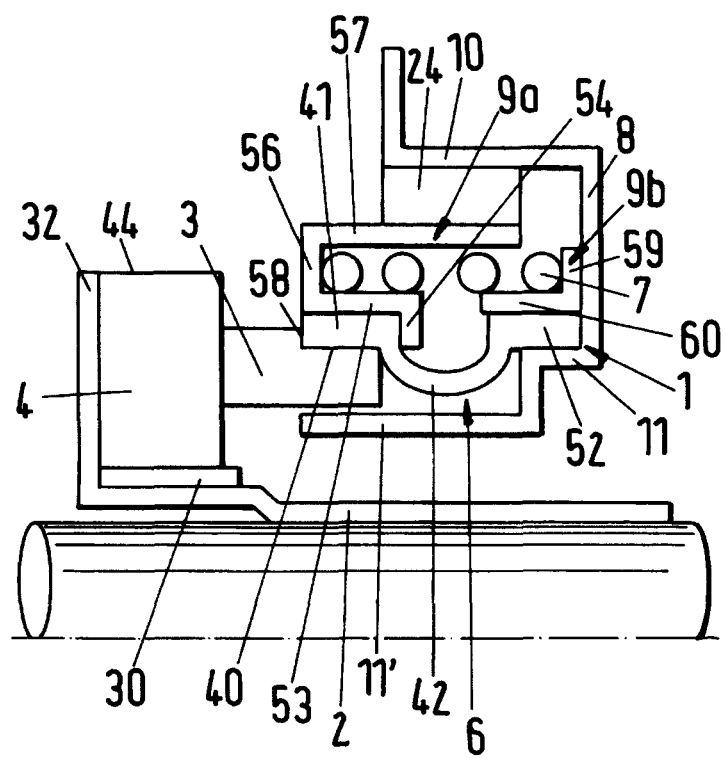
FIG. 5 shows one half of a fifth embodiment of a slide ring seal according to the invention in axial section.

FIG. 5 shows a slide ring seal with the holder 2 that is of the same configuration as in the embodiment of FIG. 2. The counter ring 4 is only covered at the end face that is facing away from the housing 1 by the annular bottom 32 of the holder 2 while its radial outer wall surface 44 is exposed. On the counter ring 4 the slide ring 3 is resting that, as in the embodiment of FIG. 2, has a recess 40 that is engaged by the cylindrical section 41 of the secondary seal 6. On the cylindrical section 41 the spring part 42 adjoins which, in contrast to the embodiment of FIG. 2, passes into a further cylindrical section 52 that is advantageously of the same configuration as the cylinder section 41.

The slide ring seal has two spring plates 9a, 9b that have axial spacing from one another and between which the pressure spring 7 extends. The spring plate 9a is positioned with an inner cylindrical section 53 on the cylinder section 41 of the secondary seal 6. The free end of the cylinder section 53 has a radially inwardly oriented annular flange 54 with which the cylindrical section 41 of the secondary seal 6 is axially loaded. At the other end the cylinder section 53 passes with a radially outwardly oriented annular flange 56 into an outer cylinder section 57 that extends into the housing 1 and that covers the pressure spring 7 across most of its length in radial outward direction. The annular flange 56 is positioned at the level of a shoulder surface 58 by means of which the recess 40 in the slide ring 3 is axially delimited in the direction toward the counter ring 4. By the force of the pressure spring 7 the cylinder section 41 of the secondary seal 6 is axially clamped between this shoulder surface 58 and the flange 54 of the spring plate 9a.

Between the radial outer cylinder wall 57 of the spring element 9a and the outer wall 10 of the housing 1 the damping part 24 is positioned that is embodied according to FIG. 12, 12a, 12b or 13. In contrast to the preceding embodiments, the damping part 24 does not project axially from the housing 1.

The spring plate 9b has an L-shaped cross-section and is forced by pressure spring 7 with its radially outwardly oriented short flange 59 against the housing bottom 8. The flange 59 adjoins a cylindrical wall 56 with which the spring plate 9b rests with radial pretension on the cylinder section 52 of the secondary seal 6. The cylinder section 52 is positioned on the inner wall 11 of the housing 1. The inner wall section 11' of the housing 1 extends to a point below the slide ring 3 that has radial spacing from the inner wall section 11'. By means of it the spring part of the secondary seal 6 is covered radially inwardly.

The pressure spring 7 is radially centered properly by the cylinder sections 53, 57 of the spring plate 9a. The damping part 24 is in turn arranged between the spring plate 9a and the housing 1. The ribs 39 of the damping part 24 are resting under radial pretension on the housing bottom 10 as well as the cylinder section 57 of the spring plate 9a.

Figure 6:
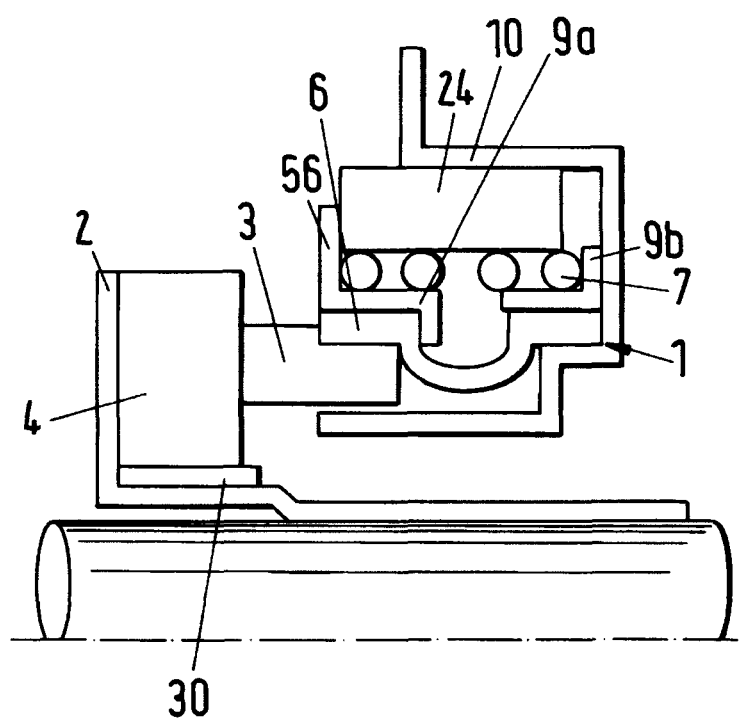
FIG. 6 shows one half of a sixth embodiment of a slide ring seal according to the invention in axial section.

FIG. 6 shows a modification of the embodiment according to FIG. 5. The spring plate 9a has a Z-shaped cross-section and is positioned with its radially outwardly oriented annular flange 56 on the end face of the damping part 24. In contrast to the preceding embodiments, the damping part 24 projects axially from the housing 1. By means of the annular flange 56 of the spring part 9a the damping part 24 is axially secured. As in the preceding embodiment, the spring plate 9a not only serves as a support for the pressure spring 7 but also as an axial securing means for the damping part 24. The damping part 24 surrounds the pressure spring 7 almost about the entire axial length so that it is property radially centered. In this embodiment, radial contact between the damping part 24 and the pressure spring 7 as well as the outer wall 10 of the housing 1 is provided.

In other respects, this embodiment is identical to the slide ring seal according to FIG. 5.

Figure 7:
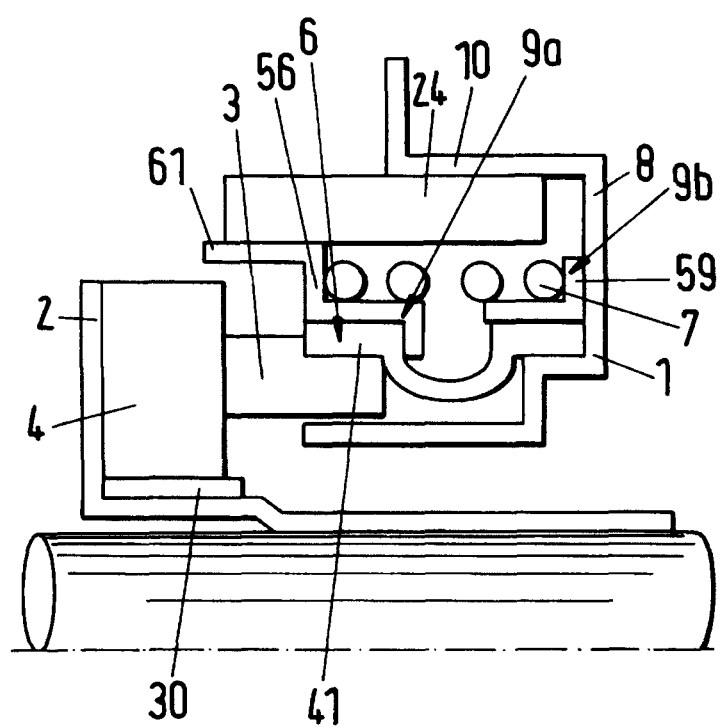
FIG. 7 shows one half of a seventh embodiment of a slide ring seal according to the invention in axial section.

In the embodiment according to FIG. 7 the damping part 24 is resting on a cylinder section 61 of the spring plate 9a. The cylinder section 61 extends in the direction of the counter ring 4 away from the annular flange 56. The cylinder section 61 overlaps the counter ring 4 at minimal radial spacing. Between the shoulder surface 56 of the spring plate 9a and the flange 59 of the spring plate 9b the pressure spring 7 extends.

The damping part 24 extends axially out of the housing 1. Within the housing 1 the damping part 24 is resting against the inner wall surface of the outer wall of the housing with radial pretension. Outside of the housing 1 it is supported by the cylinder section 61 of the spring plate 9a. It is moreover radially inwardly loaded by the damping part 24 so that it forces the radial cylinder section 41 of the secondary seal 6 against the slide ring 3.

The damping part 24 extends up to the level of the end face of the counter ring 4 that is facing the slide ring 3. As in the preceding embodiments, the damping part 24 has axial spacing from the housing bottom 8.

Figure 8:
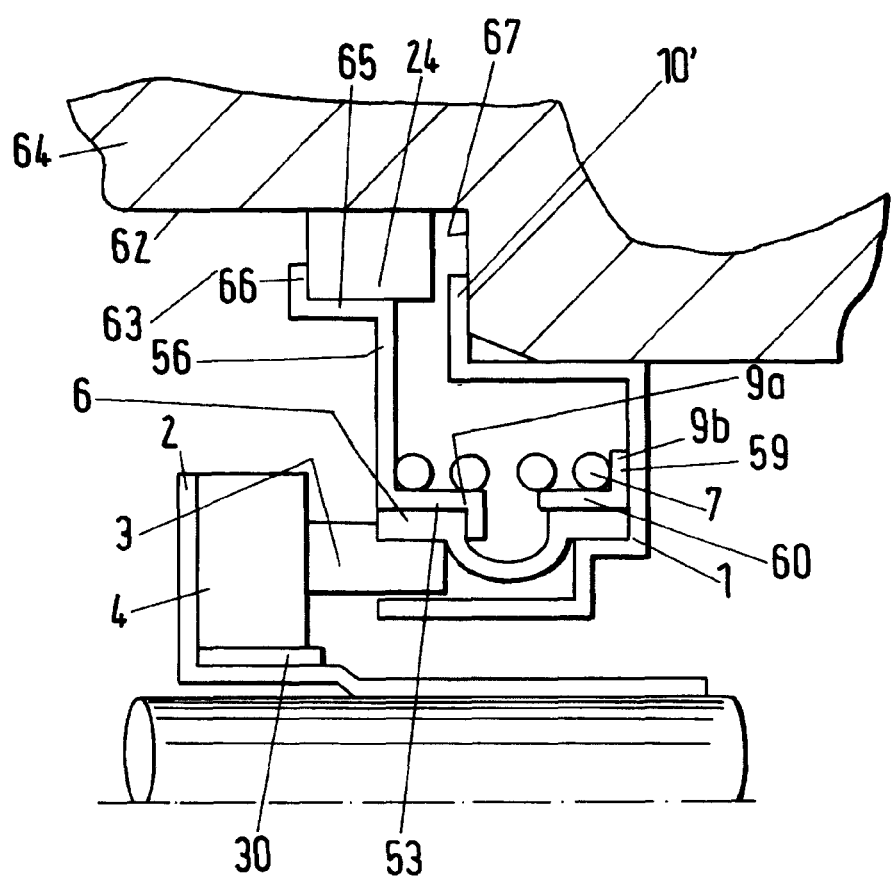
FIG. 8 shows one half of a eight embodiment of a slide ring seal according to the invention in axial section.

In the embodiment according to FIG. 8, the damping part 24 is arranged between the spring plate 9a and an inner wall 62 of a receiving space 63 of a pump housing 64. The spring plate 9a has radially outwardly oriented flange 56 that, in contrast to the preceding embodiment, is significantly wider and at the outer radial end passes into a cylinder section 65 on which the damping part 24 is resting. The cylinder section 65 projects into the area above the counter ring 4 and at the free end is provided with a radially outwardly oriented flange 66 which rests against the end face of the damping part 24 and secures it axially. The flange 56 is positioned with axial spacing relative to the radially outwardly oriented housing flange 10' with which the housing 1 rests against the bottom 67 of the receiving space 63. The damping part 24 has axial spacing from the flange 10'.

The flange 56 projects radially so far outwardly that it is positioned at the level of the housing flange 10'.

The pressure spring 7 extends between the flange 56 and the radially outwardly oriented flange 59 of the spring plate 9b. The pressure spring 7 is resting on the cylinder sections 53, 60 of the two spring plates 9a, 9b.

In other respects, this embodiment is of the same configuration as the preceding embodiment.

Figure 9:
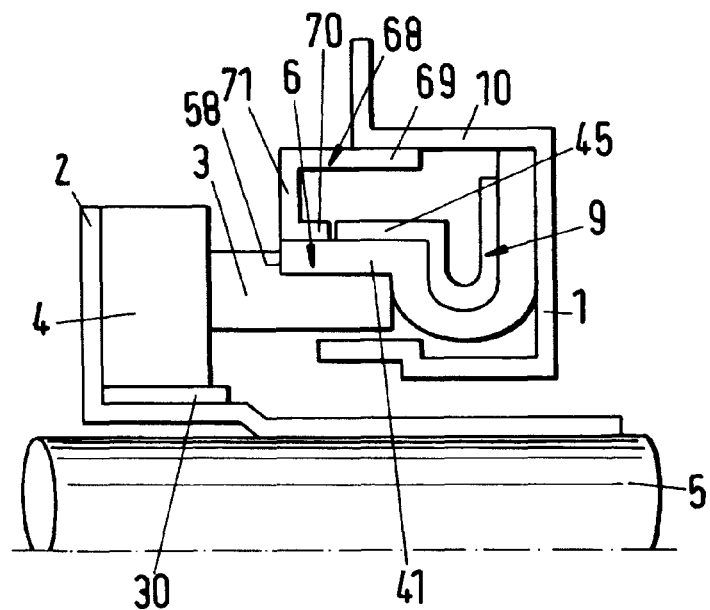
FIG. 9 shows one half of a ninth embodiment of a slide ring seal according to the invention in axial section.

The slide ring seal according to FIG. 9 has damping part 68 that in contrast to the damping part 24 has cylindrical spring sections instead of ribs and depressions. This embodiment, with the exception of the configuration of the damping part, is of identical configuration as the embodiment of FIG. 2. The damping part 68 is embodied as an annular cup that has a radial outer cylinder wall 69 and a radial inner cylinder wall 70 passing into one another with a radial bottom 71. The two cylinder walls 69, 70 are positioned coaxial to one another and to the shaft 5 to be sealed. The outer cylinder wall 69 is axially longer than the inner cylinder wall 70. The outer cylinder wall 69 projects into the housing 1 and rests against the inner wall surface of the housing wall 10 with radial pretension. The shorter cylinder wall 70 is positioned on the cylindrical section 41 of the secondary seal 6 and loads it in radial direction. The cylinder wall 70 has minimal axial spacing from the cylinder section 45 of the spring plate 9. The bottom 71 of the damping part 68 that is positioned in a radial plane is positioned at the level of the shoulder surface 58 of the slide ring 3.

The cylinder wall 69 is radially elastically yielding so that it can compensate corresponding radial movements of the slide ring 3 by elastic deformation. The noise development is thereby prevented. As in the case of the damping part 24 the provided microfriction contributes to an optimal damping action.

Figure 10:
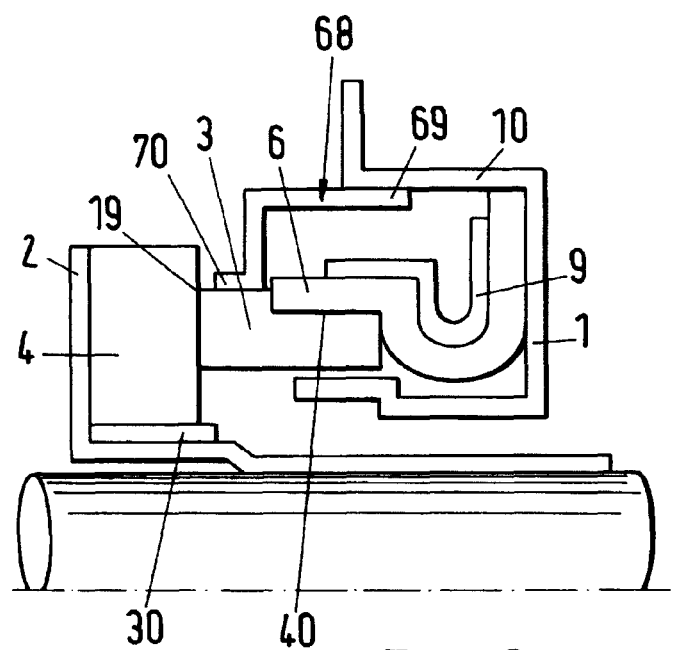
FIG. 10 shows one half of a tenth embodiment of a slide ring seal according to the invention in axial section.

The slide ring seal according to FIG. 10 corresponds substantially to the embodiment of FIG. 9. The damping part 68 has the cylindrical outer wall 69 which rests in the described way with radial pretension against the inner side of the wall 10 of the housing 1. In contrast to the preceding embodiment the radially inwardly positioned cylinder wall 70 does not extend in the same direction as the outer cylinder wall 69 but in the direction of the counter ring 4. The inner cylinder wall 70 is positioned on the outer wall surface 19 of the slide ring 3 in the area outside of the recess 40. The cylinder wall 69, because of its axial length, is sufficiently springy and elastic so that it can yield radially.

The slide ring seal in other respects is of the same configuration as in the embodiment of FIG. 9.

Figure 11:
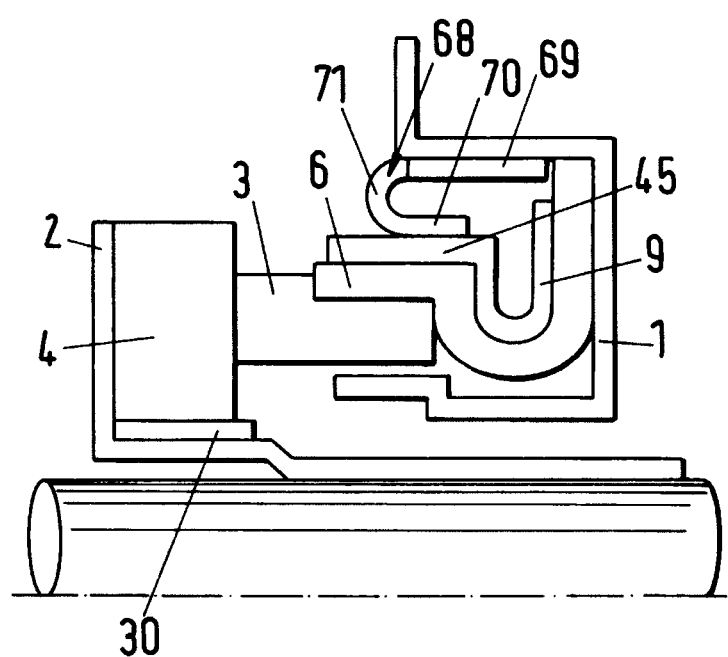
FIG. 11 shows one half of a eleventh embodiment of a slide ring seal according to the invention in axial section.

FIG. 11 shows a damping part 68 whose bottom 71 in axial section is curved in a part-circular configuration. The radially inner cylinder wall 70 is positioned on the cylinder section 45 of the spring plate 9 with radial pretension.

In the described embodiment according to FIGS. 9 to 11 the outer cylinder wall 69 in accordance with FIGS. 12, 12a, 12b and 13 can be of a wave shape configuration about its circumference so that the cylinder wall will rests against the housing wall 10 only with the rib-shaped projecting parts.

Figure 14:
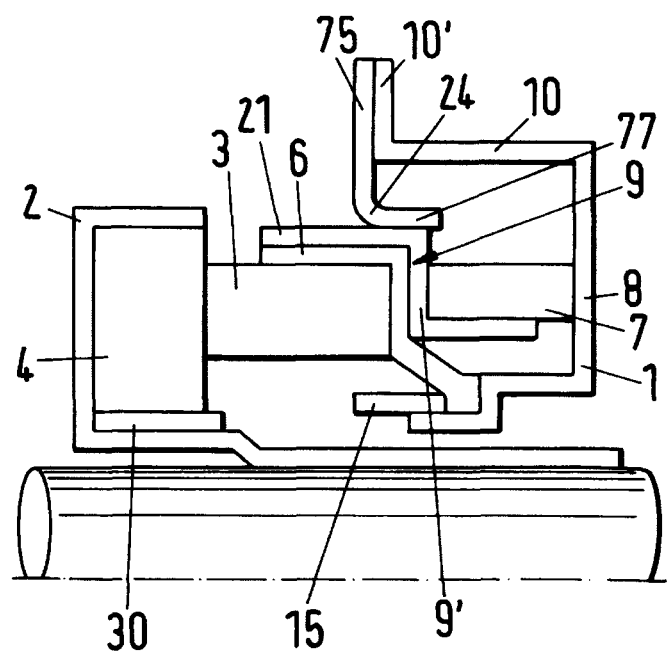
FIG. 14 shows one half of a further embodiment of a slide ring seal according to the invention in axial section.

The slide ring seal according to FIG. 14 corresponds in its configuration substantially to the embodiment of FIG. 1. The difference resides in the configuration and arrangement of the damping part 24. It is supported axially on the cylindrical part 21 of the spring plate 9 that is positioned on the secondary seal 6 and that is engaged by the pressure spring 7. The damping part 24 is supported also on the radially outwardly projecting rim 10' of the housing 1.

Figure 15:
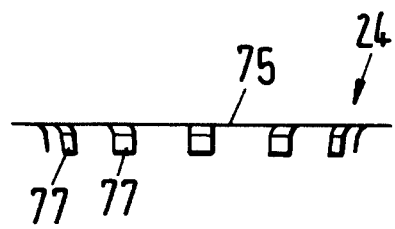
FIG. 15 shows in a side view an annular damping part of the slide ring seal according to FIG. 14.
Figure 16:
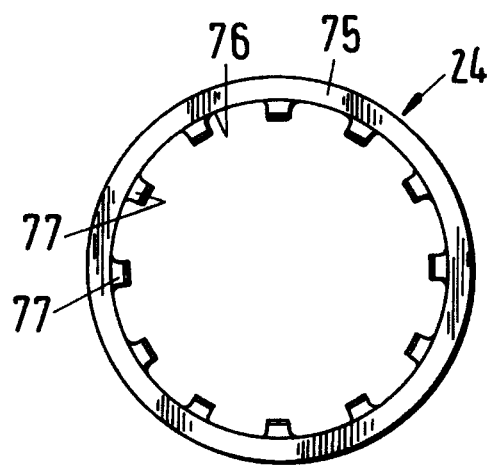
FIG. 16 shows the damping part according to FIG. 15 in plan view.

The damping part 24 has a configuration as illustrated in FIGS. 15 and 16. It is embodied as a closed ring and has a ring part 75 that is embodied as a flat annular disk. On the inner side 76 of the ring part 75 there are spring tongues 77 distributed about the circumference that are advantageously of identical configuration and advantageously are spaced at the same spacing from one another. The spring tongues project at a slant inwardly and are elastically deformed in the mounted position of the damping element 24.

In the slide ring seal according to FIG. 14 the spring tongues 77 are resting with elastic deformation on the cylindrical part 21 of the spring plate 9. With the flat annular disk 75 the damping elements 24 rests against the radially outwardly oriented annular rim 10' of the housing 1. The spring tongues 77 project in the direction toward the bottom 8 of the housing 1 slightly past the annular stay 9' of the spring plate 9. The spring tongues 7 have also a radial spacing from the inner wall surface of the outer wall 10 of the housing 1.

The damping part 24 is mounted in such a way that the spring tongues 77 generate microfriction for noise damping in the circumferential direction. This circumferential direction, as in the damping part 24 according to FIGS. 12, 12a, 12b and 13, is the main direction for generating the microfriction while the axial direction of the slide ring seal plays no role in vibration damping.

Figure 17:
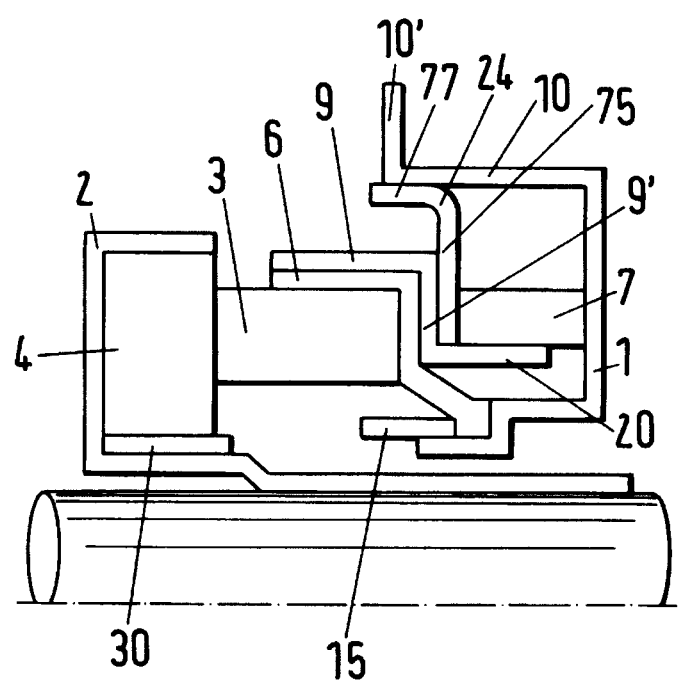
FIG. 17 shows one half of a further embodiment of a slide ring seal according to the invention in axial section.
Figure 18:
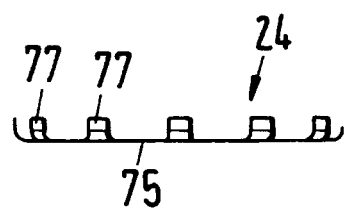
FIG. 18 shows a further embodiment of an annular damping part of the slide ring seal according to FIG. 17.
Figure 19:
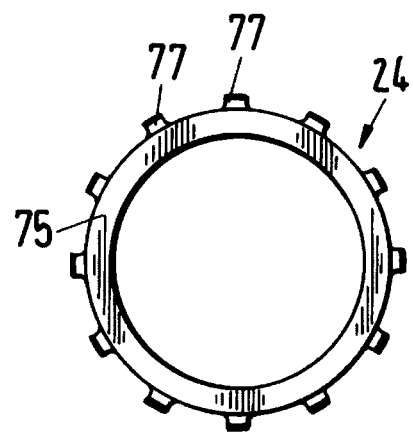
FIG. 19 is a plan view of the damping part according to FIG. 18.

The slide ring seal according to FIG. 17 is of the same configuration as the slide ring seal of FIG. 14. Only the damping part 24 is of a different embodiment and has a different installation position. As shown in FIGS. 18 and 19, the spring tongues 77 of the damping part 24 are provided on the outer side of the disk-shaped annular part 75. The spring tongues 77 are oriented at a slant outwardly. They are positioned in the mounted position with elastic deformation against the inner side of the outer wall 10 of the housing 1 (FIG. 17). The spring tongues 77 extend from the ring part 75 slightly past the radially outwardly oriented free rim 10' of the housing 1. The spring tongues 77 have radial spacing from the spring plate 9.

The ring part 75 of the damping part 74 rests on the radial annular stay 9' of the spring plate 9 under the force of the pressure spring 7. The ring part 75 can extend up to the radially inwardly positioned cylinder part 24 the spring plate 9.

In this embodiment the elastic spring tongues 77 are resting with elastic pretension on the housing 1 while the ring part 75 positioned in a radial plane rests against the radial annular stay 9' of the spring plate 9.

Figure 20:
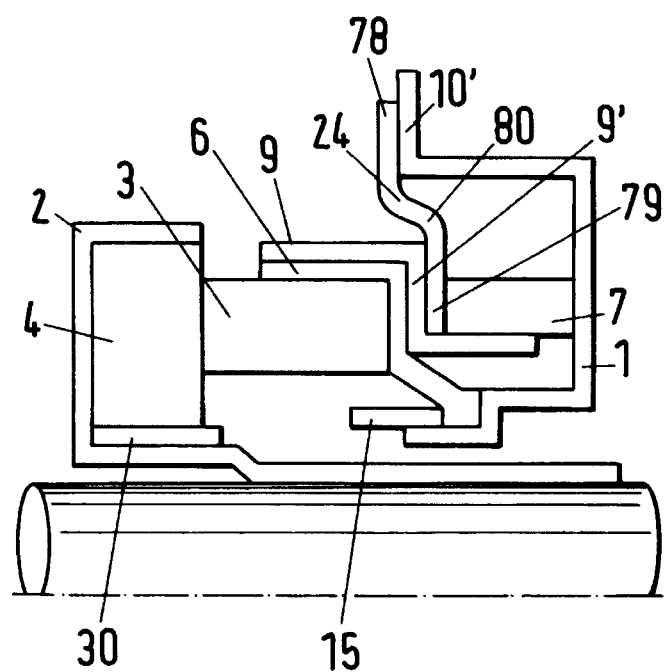
FIG. 20 shows one half of a further embodiment of a slide ring seal according to the invention in axial section.

FIG. 20 shows a slide ring seal that is substantially of the same configuration as the slide ring seal according to FIG. 14 or 17. Only the damping part 24 has a different configuration. The damping part 24 has two disk-shaped ring parts 78, 79 that each are arranged in a radial plane of the slide ring seal and pass into one another by means of a conical part 80 serving as a spring part. The radial outer ring part 78 is positioned on the free edge 10' of the housing 1. The radial inner ring part 79 is resting on the radial annular stay 9' of the spring plate 9. The ring part 79 is forced by the pressure spring 7 axially against the radial annular stay 9' of the spring plate 9.

In this embodiment the microfriction is generated between the radially extending ring parts 78, 79 of the damping part 24 and the radial rim 10' of the housing 1 as well as the radial annular stay 9' of the spring plate 9.

Figure 21:
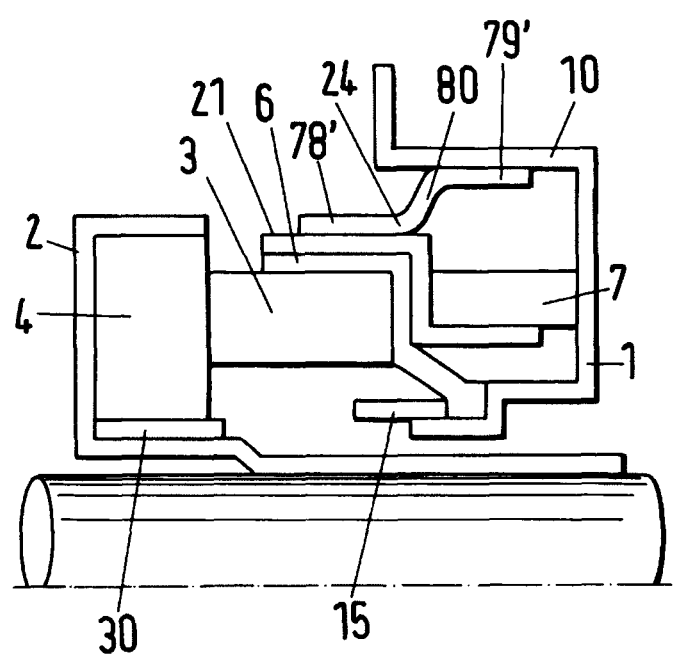
FIG. 21 shows one half of a another embodiment of a slide ring seal according to the invention in axial section.

In the slide ring seal according to FIG. 21 the damping part 24 has cylindrical ring parts 78', 79'. The damping part 24 is arranged such that the annular part 78' rests on the outer side of the cylinder part 21 of the spring plate 9 and the ring part 79' rests on the inner side of the outer wall 10 of the housing 1. The cylindrical ring parts 78' and 79' are connected to one another by the conical part 80. In other respects, the slide ring seal is of the same configuration as the slide ring seal according to FIG. 20.

The ring parts 69, 70; 77, 78, 79; 78', 79' can be segmented.

Figure 22:
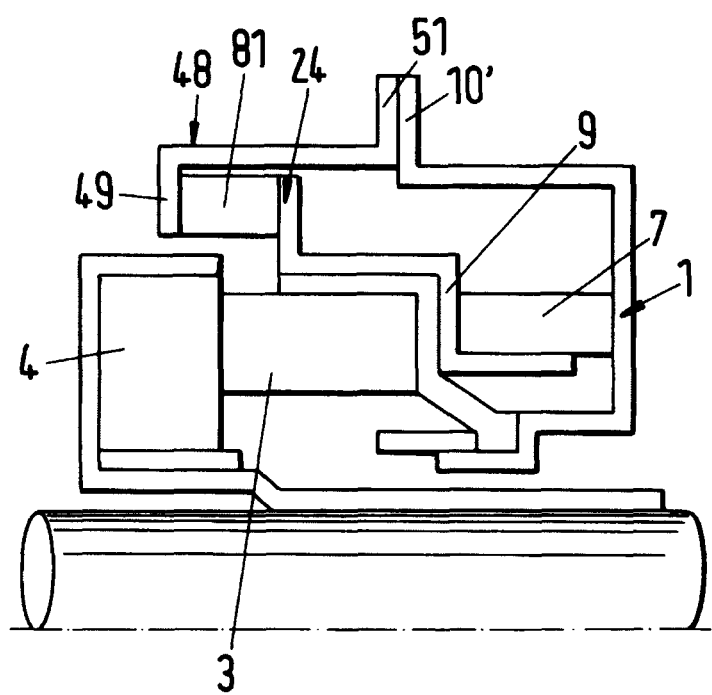
FIG. 22 shows one half of a yet another embodiment of a slide ring seal according to the invention in axial section.

In the slide ring seal according to FIG. 22, the damping part 24 is formed monolithically with the spring plate 9. The slide ring seal is substantially of the same configuration as the slide ring seal according to FIG. 1. The radially outwardly oriented annular rim of the spring plate 9 forms the damping part 24 that is surrounded by the retaining element 48. It is embodied in accordance with FIG. 4 and is fastened with its flange 51 on the free rim 10' of the housing 1. On the radially inwardly projecting flange 49 of the retaining element 48 a spring part 81 is supported that extends between the flange 49 and damping part 24 and rests with axial pretension on these two parts. The spring plate 81, for example, can be in the form of a corrugated spring. Basically, it is also possible to arrange pressure springs in distribution about the circumference of the damping part 24 that extend between the flange 49 and the damping part 24. The pressure force exerted by the pressure spring 7 is higher than the spring force that is exerted by the spring part 81. In this way it is ensured that the slide ring 3 and the counter ring 4 will rests against one another with the required axial force needed for the sealing action.

The specification incorporates by reference the entire disclosure of German priority document 10 2009 049 093.0 having a filing date of Oct. 1, 2009.

While specific embodiments of the invention have been shown and described in detail to illustrate the inventive principles, it will be understood that the invention may be embodied otherwise without departing from such principles.

What is claimed is:

1. A slide ring seal comprising:
a housing;
a slide ring;
a counter ring;
a pressure spring arranged in the housing and a spring plate embodied separate from the pressure spring and separate from the housing and disposed in the housing, wherein the spring plate supports the pressure spring, and wherein the slide ring and the counter ring rest seal-tightly against one another under axial force action applied by the pressure spring;
at least one holder receiving the counter ring and securing the counter ring to a shaft;
an annular sleeve serving as a seal, wherein the counter ring is seated on the annular sleeve and is secured by the annular sleeve in the at least one holder;
a secondary seal that seals between the slide ring and the housing and that is separate from the pressure spring and from the spring plate;
at least one damping part that is separate from the pressure spring and separate from the secondary seal, wherein the at least one damping part is monolithically formed so as to comprise at least one shaped sheet metal part provided monolithically with at least one elastically deformable spring part, wherein the at least one spring part is supported under pretension on a support area and generates a microfriction between the at least one damping part and the support area;
wherein the at least one spring part projects axially past the housing toward the counter ring and wherein the at least one spring part is a ring part that surrounds at a spacing the slide ring and the counter ring.

2. The slide ring seal according to claim 1, wherein the at least one spring part is supported on the housing.

3. The slide ring seal according to claim 2, wherein the at least one spring part is supported with radial pretension on the housing.

4. The slide ring seal according to claim 2, wherein the at least one spring part is supported on the spring plate.

5. The slide ring seal according to claim 2, wherein the at least one spring part is supported with axial pretension on the housing.

6. The slide ring seal according to claim 1, wherein the at least one spring part is provided with a profiling extending about a circumference of the at least one spring part.

7. The slide ring seal according to claim 6, wherein the profiling extends in a wave shape in a circumferential direction.

8. The slide ring seal according to claim 7, wherein the at least one spring part is supported by raised portions of the profiling on the housing.

9. The slide ring seal according to claim 1, wherein the damping part rests with interposition of the spring plate on the slide ring.

10. The slide ring seal according to claim 1, wherein the damping part rests with interposition of the secondary seal on the slide ring.

11. The slide ring seal according to claim 1, wherein the at least one spring part forms an outer wall section that is positioned coaxially to an inner wall section of the damping part.

12. The slide ring seal according to claim 11, wherein the inner and outer wall sections are connected to one another by a bottom extending transversely to a longitudinal axis of the damping part.

13. The slide ring seal according to claim 12, wherein the bottom in section is curved in a part-circular shape.

14. The slide ring seal according to claim 12, wherein the inner and outer wall sections extend away from the bottom in a same direction.

15. The slide ring seal according to claim 12, wherein the inner and outer wall sections extend away from the bottom in opposite directions.

16. The slide ring seal according to claim 1, comprising a receiving space, wherein the at least one spring part is supported with radial pretension on a wall of the receiving space.

17. A slide ring seal comprising:
a housing;
a slide ring;
a counter ring;
a pressure spring arranged in the housing, wherein the slide ring and the counter ring rest seal-tightly against one another under axial force action applied by the pressure spring;
at least one holder receiving the counter ring and securing the counter ring to a shaft;
an annular sleeve serving as a seal, wherein the counter ring is seated on the annular sleeve and is secured by the annular sleeve in the at least one holder;
at least one damping part that is separate from the pressure spring, wherein the at least one damping part is monolithically formed so as to comprise at least one shaped sheet metal part provided monolithically with at least one elastically deformable spring part, wherein the at least one spring part is supported under pretension on a support area and generates a microfriction between the at least one damping part and the support area, and wherein the at least one spring part is a ring part the surrounds at a spacing the slide ring and the counter ring;
a spring plate that is separate from the housing and is disposed in the housing;
a secondary seal that seals between the slide ring and the housing and that is separate from the pressure spring and separate from the at least one damping part;
wherein the at least one damping part is resting on the slide ring with interposition of the spring plate and the secondary seal such that the at least one damping part is directly resting on the spring plate, the spring plate in turn is directly resting on the secondary seal, and the secondary seal in turn is directly resting on the slide ring.

* * * * *